Feb. 28, 1939.    L. N. UDELL    2,149,000
METHOD OF AND APPARATUS FOR MAKING ICE
Filed Nov. 9, 1933    3 Sheets-Sheet 1
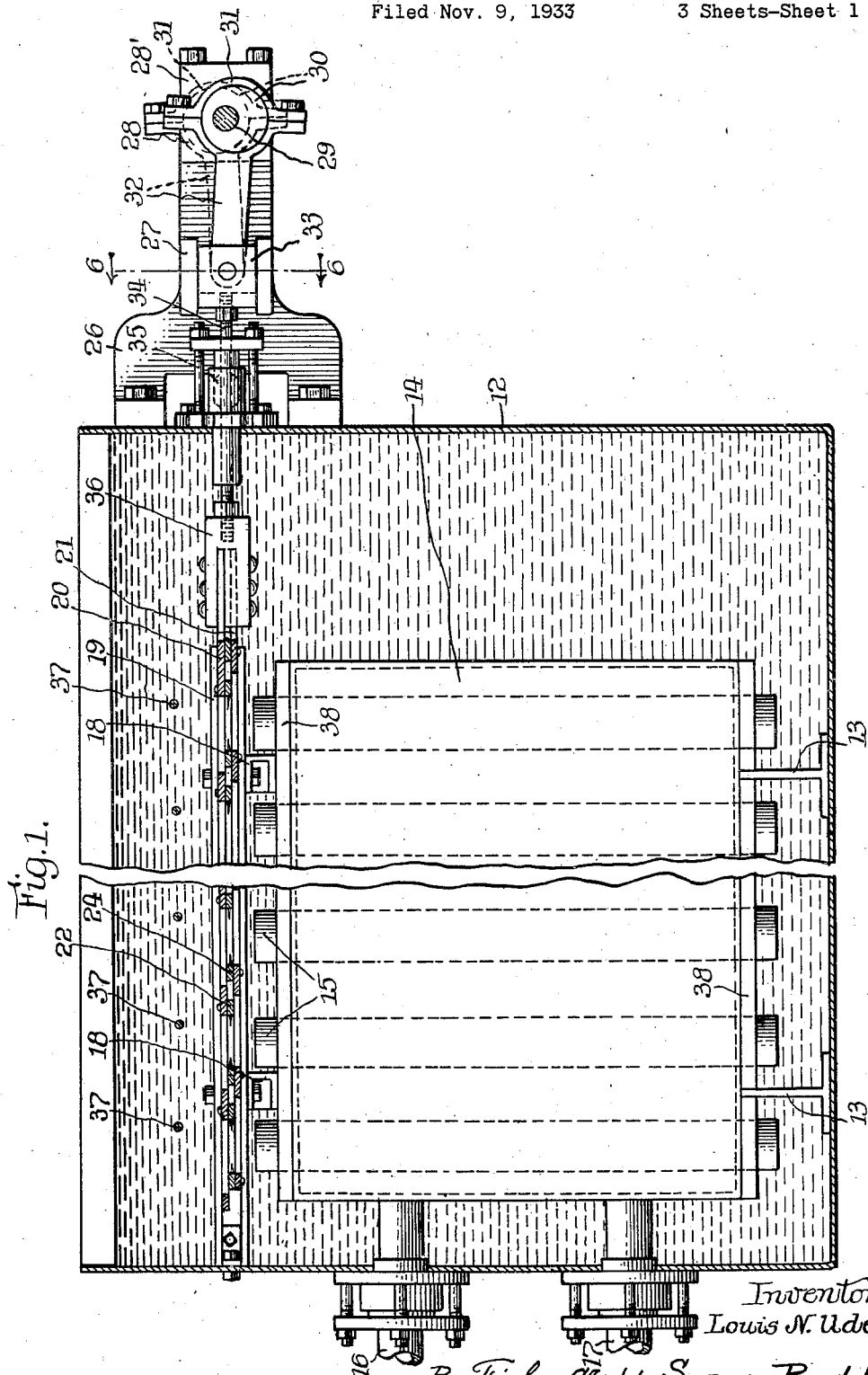
Inventor:
Louis N. Udell,
By Fisher, Clapp, Soans + Pond, Attys

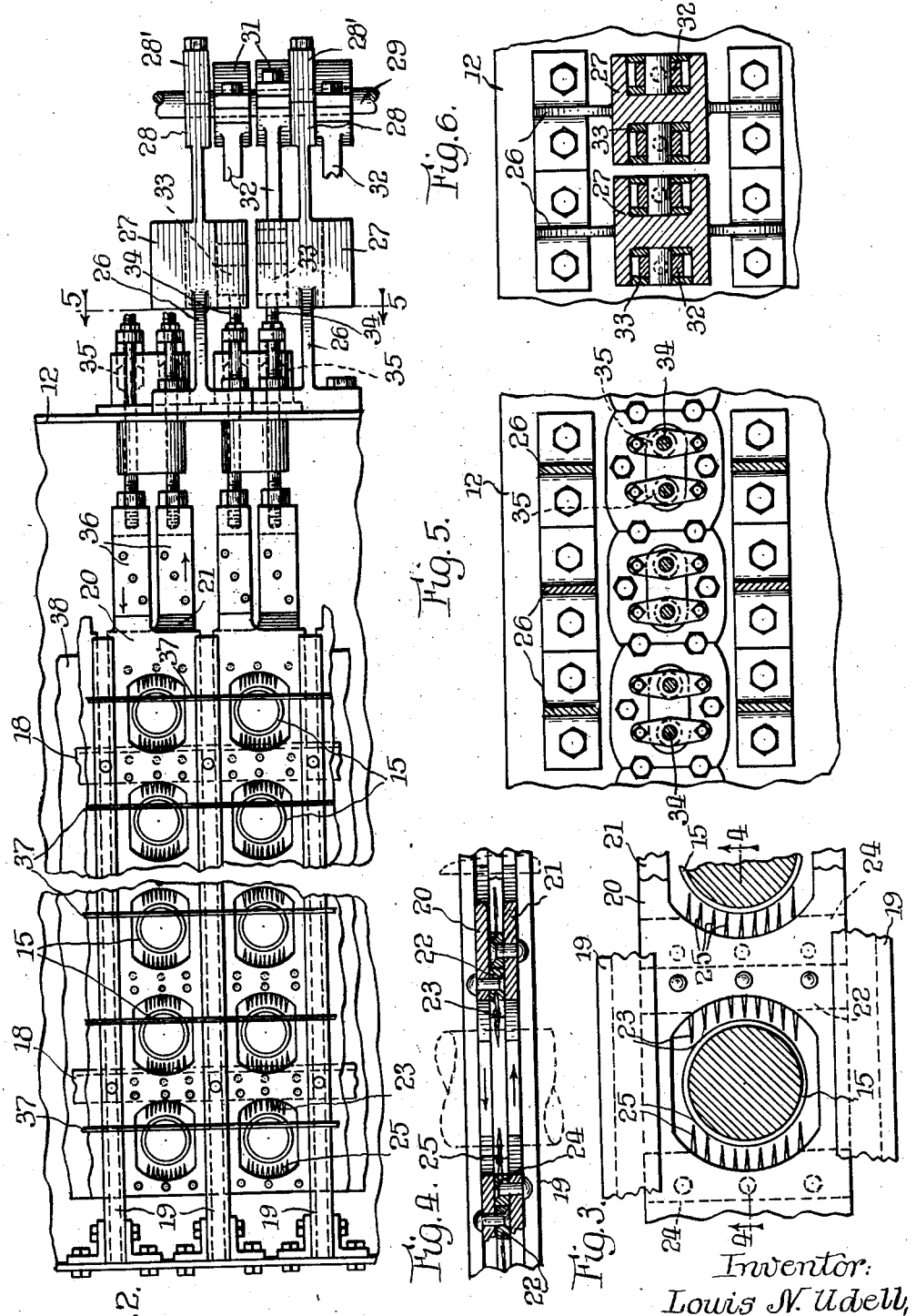

Feb. 28, 1939. L. N. UDELL 2,149,000
METHOD OF AND APPARATUS FOR MAKING ICE
Filed Nov. 9, 1933 3 Sheets-Sheet 3

Inventor:
Louis N. Udell,
By Fisher, Clapp, Soans & Pond, Attys.

Patented Feb. 28, 1939

2,149,000

UNITED STATES PATENT OFFICE 2,149,000

METHOD OF AND APPARATUS FOR MAKING ICE

Louis N. Udell, Chicago, Ill., assignor to Barrett-Udell Company, Chicago, Ill., a corporation of Illinois Application November 9, 1933, Serial No. 697,271

12 Claims. (Cl. 62—164)

This invention relates to ice making methods and machines, and has reference more particularly to an improved method of and apparatus for making ice in comparatively small pieces—either in the form of relatively long and slender sticks, or in the form of small chips, blocks or cubes. The demand for ice in the latter form is very extensive, and, for domestic use, is served to a considerable extent by the cellular freezing pans of the well known domestic refrigerating cabinets.

The general object of the present invention is to provide an improved method of and apparatus for forming in a continuous operation and in substantial quantities such sticks, chips, blocks or cubes which are very extensively used in the commercial manufacture of ice cream and analogous frozen products, for icing beverages, and for many other purposes.

The improved ice making method and apparatus forming the subject matter of this invention is based on the novel principle of freezing the ice in an open ended mold preferably of tubular form and any desired cross section and entirely immersed in a body of water to be frozen, lowering the temperature of the mold to a sub-freezing point, so that the mold gradually fills with a solid body of ice building up on the internal walls thereof, and then warming the walls of the mold so as to free the body of ice therefrom, whereupon the ice rises from the mold by flotation to the surface of the body of water in which the mold is immersed. For large scale manufacture a large number of such molds preferably grouped in parallel relation in a single water tank are employed. And where the final product is desired in chip, block or cube form, the frozen sticks, as they rise from the molds, are successively cut to the desired lengths, the pieces floating to the top of the water as fast as they are severed, whence they can readily be raked off and collected. To facilitate the cutting of the sticks into such pieces as the sticks float upwardly out of the molds, I provide stop devices above the molds that arrest further rising movement of the sticks prior to each cutting operation.

One practical apparatus well adapted to carry out the method and effectuate the object of the invention is illustrated in the accompanying drawings, in which:—

Fig. 1 is a side elevation, partly in vertical section and broken out, of the apparatus.

Fig. 2 is a fragmentary top plan view of the same.

Fig. 3 is an enlarged fragmentary top plan view of one form of chip-severing mechanism.

Fig. 4 is a vertical section on the line 4—4 of Fig. 3.

Fig. 5 is a vertical section on the line 5—5 of Fig. 2.

Fig. 6 is a vertical section on the line 6—6 of Fig. 1.

Figure 9:
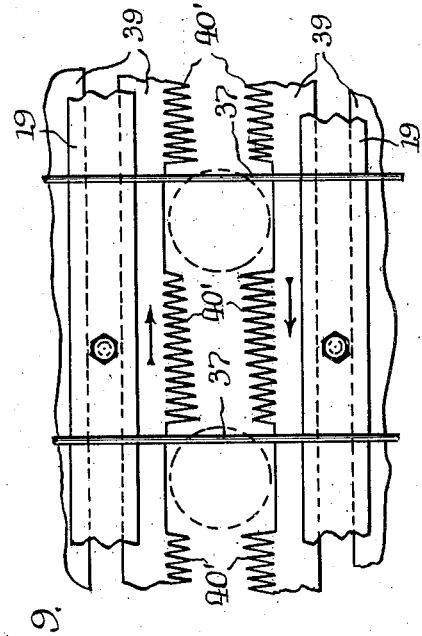
Fig. 9 is a fragmentary enlarged top plan view of a modification of the form of stick cutting teeth shown in Fig. 8.

Referring to the drawings, 12 designates a water-tight tank, open at the top, and adapted to be filled with water to about the level indicated in Fig. 1.

Supported on sleepers 13 in the tank 12 is a completely enclosed liquid-tight compartment 14, extending through the top and bottom walls of which are a plurality of rows of molds in the form of open-ended tubes 15, these tubes being secured in the tank by liquid-tight joints or, in the case of a casting, being integral with the top and bottom walls of the tank.

16 and 17 designate pipes mounted on a wall of the tank 12 and extending into an adjacent wall of the compartment 14, either of which pipes may serve as an inlet, and the other as an outlet, for refrigerating and thawing mediums adapted to be circulated through the compartment 14.

Supported on the top wall of the compartment 14, which, as will be seen later, constitutes a sealed freezing and thawing tank, are a plurality of channel bars 18 that form supports for a group of I-beam guide bars 19 laid transversely thereacross and secured thereto.

The bars 19, as best shown in Figs. 3 and 4, constitute guides for upper and lower reciprocating cutter bars 20 and 21. To the lower side of the bar 20 is secured a plurality of blocks 22 carrying an arcuate row of teeth 23 preferably in the form of sharp pointed spikes. And to the upper side of bar 21 are secured similar blocks 24 carrying similar arcuate rows of sharp pointed teeth 25, the teeth 23 and 25 preferably lying in the same horizontal plane. The bars 20 and 21 are formed with openings as shown in Figs. 3 and 4, for the passage of the upper end of an ice stick formed in one of the molds 15 and rising by flotation therefrom.

The reciprocating cutter bars 20 and 21 may be actuated by any suitable or convenient mechanism, and in Figs. 1, 2, 5 and 6 I have illustrated one practical form of such mechanism, as follows.

Bolted to a side wall of the tank 12 are a plurality of castings 26, integral with each of which is a duplex cross head support 27, and a shaft half-bearing 28 that has complemental attached half-bearings 28' bolted thereto. Journaled in the bearings 28, 28' is a shaft 29 on which are fixed a group of pairs of eccentrics 30, the eccentrics of each pair being 180° apart. The two eccentrics of each pair are equipped with the customary eccentric straps 31 and links 32, the latter being pivotally connected to cross heads 33 slidably mounted in the duplex cross head bearings 27. To each cross head is connected a rod 34, which extends through a stuffing box 35 and the side wall of the tank and at its inner end is coupled to a block 36 in which one of the reciprocating cutter bars 20 and 21 is mounted. As shaft 29 is rotated, the two cutter bars 20 and 21 are thus reciprocated simultaneously in opposite directions.

Extending crosswise of the upper portion of the tank 12 above the cutter bars and the upper ends of the molds 15, and preferably eccentrically of the latter, are a plurality of stops which may consist of wires 37.

Briefly describing the operation, the tank 12 is filled with water nearly to its top, and either manually or automatically maintained substantially at that level. A refrigerating agent is circulated through the compartment 14 by means of the pipes 16 and 17, whereby the walls of the molds 15 are lowered to a sub-freezing temperature. The molds are, of course, completely filled with water, so that ice forms and builds up on the internal walls of the molds until a substantially solid stick of ice is formed in each mold. To prevent the formation of ice on the top and bottom walls of the tank 14 I preferably equip the latter with insulating coverings 38 apertured for the passage of the tubular molds 15 therethrough.

After the ice blocks have been formed, circulation of the refrigerating medium is intermitted, and replaced by circulation of a thawing medium. This causes the sticks of ice to become detached from the walls of the molds, whereupon they rise by flotation until their upper ends strike the stops 37. At this time the cutting teeth 23, 25 of the two cutter bars are separated sufficiently to allow the sticks of ice to rise between them. As soon as this has happened, power is applied to the shaft 29, whereupon the teeth 23, 25, are moved toward each other, and by penetrating the stick, sever the top portion therefrom. The severed chips at once rise to the surface of the water and as the teeth again separate, the sticks again rise and are again arrested by the stops 37, whereupon on the next half revolution of the shaft 29 a second series of chips are cut off; and so on, until the sticks have been entirely sub-divided into chips or blocks, which may be raked off the surface of the tank and collected.

Figure 8:
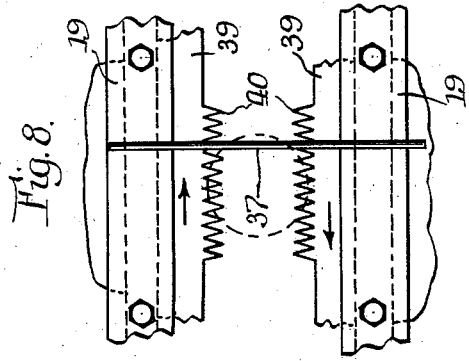
Fig. 8 is a fragmentary enlarged top plan view of a modified form of chip severing means, showing the teeth in stick cutting position.
Figure 10:
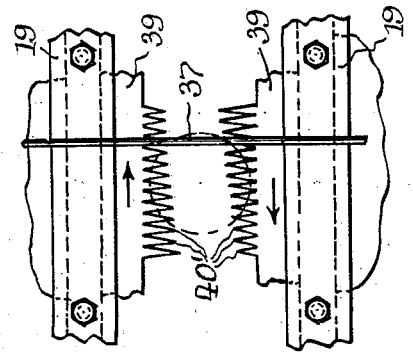
Fig. 10 is a view similar to Fig. 9, showing the teeth in stick cutting position.
Figure 7:
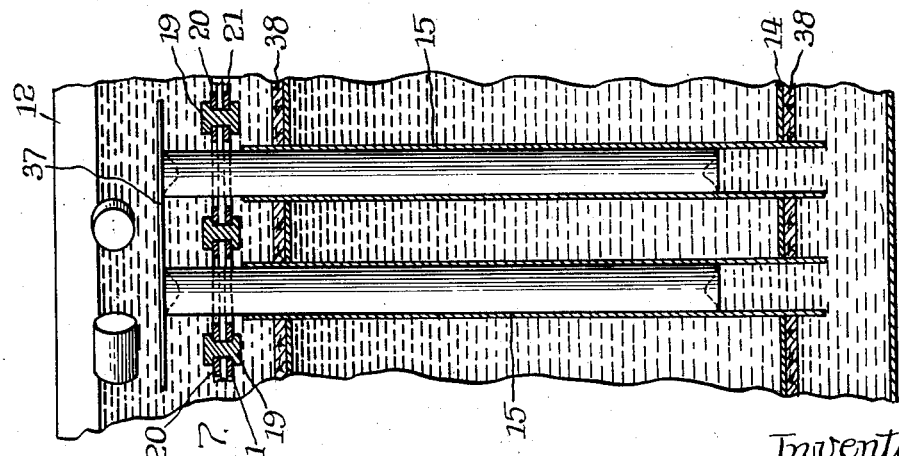
Fig. 7 is a fragmentary vertical section at right angles to the section plane of Fig. 1.

In Figs. 8 to 10 inclusive I have illustrated slightly modified forms of severing devices. For instance, as shown in Fig. 8, I may employ oppositely reciprocating cutter bars 39 slidably mounted in the guides 19 and disposed above and on opposite sides respectively of a row of molds 15, the bars 39 being formed on their adjacent edges with rows of sharp pointed teeth 40. When the stick rises by flotation into contact with the stop wire 37, the opposed rows of teeth 40 that operate on each stick are offset longitudinally so that the stick may rise between them. As the bars move in the direction of the arrows, Fig. 8, the teeth strike and gradually penetrate the opposite sides of the stick, rotating the latter on its axis, thus fracturing the stick and breaking off the chip.

The teeth 40 may be of uniform length, as shown in Fig. 8, or they may be of graduated length as shown at 40' in Figs. 9 and 10.

I have found that the forms of cutter shown in Figs. 3 and 4, 8, and 9 and 10, all give satisfactory results in reducing the ice stick to chip or block form.

By locating the stop wires 37 eccentrically of the axes of the molds 15 and preferably close to the perimeters thereof, as shown in Fig. 2, the flotation of the chips is facilitated by unbalancing the pressure caused by the buoyancy.

While I have illustrated molds of circular cross section, it is manifest that molds of rectangular or any other cross section may be usefully employed.

It will be obvious that the operative principle of the method of freezing and cutting the product may be embodied in apparatus differing in specific details from the forms of apparatus herein shown and described. Hence, I do not limit the invention to the particular embodiments thereof herein presented for purposes of illustration, but reserve all such variations, modifications and mechanical equivalents as fall within the spirit and purview of the claims.

I claim:

1. A method of making chip ice, which consists in forming an ice stick in a correspondingly shaped open ended mold immersed in a body of water to be frozen, then warming said mold to free the ice stick therefrom and permit the latter to rise by flotation, and then successively cutting off chips of ice from the stick as the latter emerges from the mold.

2. A method of making chip ice, which consists in forming an ice stick in a correspondingly shaped open ended mold immersed in substantially vertical position in a body of water to be frozen, then warming said mold to free the ice stick therefrom and permit the latter to rise by flotation, and then successively cutting off chips of ice from the stick as the latter rises and arresting the rising movement of the stick in advance of each cutting operation.

3. In an ice making apparatus, the combination of a water tank, a sealed freezing and thawing tank in said water tank adapted to be entirely immersed in the body of water in said water tank, substantially vertical open-ended tubular molds mounted in said freezing and thawing tank with their ends opening through the top and bottom walls of the latter, means for conducting freezing and thawing agents through said freezing and thawing tank, and means above said molds for successively cutting off chips from the ice sticks formed in said molds as said sticks emerge by flotation from said molds.

4. In an ice making apparatus, the combination of a water tank, a sealed freezing and thawing tank in said water tank adapted to be entirely immersed in the body of water in said water tank, substantially vertical open-ended tubular molds mounted in said freezing and thawing tank with their ends opening through the top and bottom walls of the latter, means for conducting freezing and thawing agents through said freezing and thawing tank, means above said molds for successively cutting off chips from the ice sticks formed in said molds as said sticks emerge by flotation from said molds, and means for arresting the rising movement of said sticks in advance of each cutting operation.

5. A specific form of claim 3, wherein the chip cutting means consists of a pair of oppositely reciprocating bars disposed transversely of the tank and each equipped with cutters adapted to sever the chips from the sticks.

6. A specific form of claim 3, wherein the chip cutting means consists of a pair of oppositely reciprocating bars disposed transversely of the tank, and each equipped with a row of teeth, the teeth of the two bars adapted to penetrate the sticks on opposite sides of the latter respectively to thereby sever the chips therefrom.

7. A specific form of claim 3, wherein the chip cutting means consists of a pair of oppositely reciprocating bars extending across the upper ends of a plurality of molds and each equipped with cutters adapted to sever the chips from the sticks.

8. A specific form of claim 3, wherein the chip cutting means consists of a pair of oppositely reciprocating bars extending across the upper ends of a plurality of molds and each equipped with a row of teeth, the teeth of the two bars lying in the same plane and adapted by penetrating the sticks to sever the chips therefrom.

9. A specific form of claim 3, wherein the chip cutting means consists of a pair of oppositely reciprocating bars disposed above and on opposite sides respectively of a plurality of molds, and each equipped on their adjacent edges with teeth adapted to pierce and rotate the sticks and thereby sever the chips therefrom.

10. A specific form of claim 4, wherein the stick arresting means consists of a wire extending across the upper ends of a plurality of molds above the cutters.

11. A specific form of claim 4, wherein the stick arresting means consists of a wire extending across the upper ends of a plurality of molds above the cutters and at one side of the projected axes of the molds.

12. A method of making chip ice, which consists in forming an ice stick in a correspondingly shaped mold open at its upper end and immersed in a body of water to be frozen, then warming said mold to free the ice stick therefrom and permit the stick to rise by flotation through said mold, and then breaking the freed stick into chips as it emerges from the mold.

LOUIS N. UDELL.